Nov. 10, 1964  D. F. WEAVER  3,156,256

VALVE LOCKING MEANS

Filed July 16, 1962

INVENTOR.
DONALD F. WEAVER

BY Talbert Dick & Earley
ATTORNEYS

WITNESS
NORMAN G. TRAVISS

United States Patent Office 3,156,256
Patented Nov. 10, 1964

3,156,256
VALVE LOCKING MEANS
Donald F. Weaver, Rte. 1, West Fork, Ark.
Filed July 16, 1962, Ser. No. 210,047
2 Claims. (Cl. 137—385)

This invention relates to a detachable valve locking means and more particularly to a locking means for the valves of gas, water, and like pipes, wherein it is desirable to maintain the valve in either an open or a closed condition against unauthorized actuation.

In the matter of the master valves imposed in gas, water and like line conduits, it is not only most dangerous to life and property to permit unauthorized opening and closing of the valve means, but uncontrolled gas and water may be lost in great quantities by the utilities furnishing such gas or water. These master valves are relatively large in that they are turned on or off by the use of a wrench.

The outer end of the valve stem and which is engaged by the wrench is in the form of a rectangular lug. Surrounding the inner or round stem portion of the valve is the valve housing. Obviously, it is difficult to lock the lug type valve stem against unauthorized rotation.

Therefore one of the principal objects of my invention is to provide a simple means for locking the rectangular lug type valve stem of fluid valves in either an open condition of a closed condition.

A further object of this invention is to provide a valve locking means that may be easily and quickly installed on or removed from a valve.

A still further object of this invention is to provide a valve locking device that consists only of a single bent metal sheet member and a padlock.

Still further objects of my invention are to provide a valve locking means that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
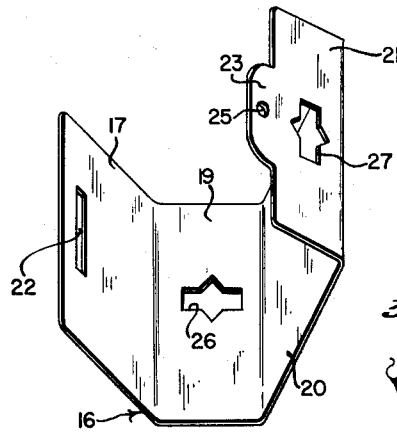
FIG. 1 is a perspective view of my valve locking jacket formed from a single sheet of material.
Figure 3:
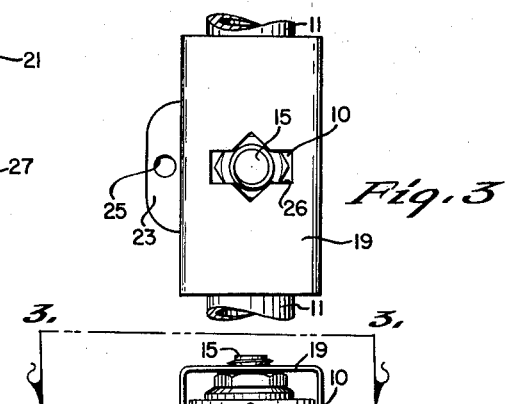
FIG. 3 is a plan view of the other side of the installed device.

In these drawings I have used the numeral 10 to generally designate a valve housing imposed in a pipe conduit 11. The numeral 12 designates a valve stem rotatably extending through the valve housing 10 and having the usual rectangular lug portion 13 on its outer end and the projection 15 on its other end. It is to such a valve that I use my device and which I will now describe in detail.

Figure 4:
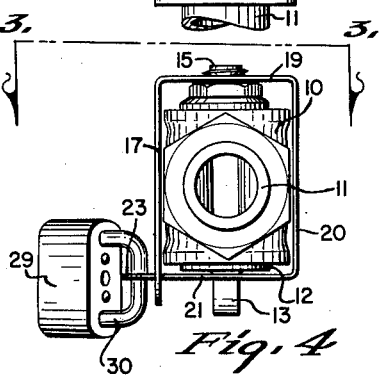
FIG. 4 is an open longitudinal view of the installed device using an ordinary padlock.

The numeral 16 generally designates the jacket housing of my device and which is cut, formed and bent from a single sheet of metal, plastic or like. The material of which this jacket is fabricated should have some flexibility so that it can be opened and closed around the valve 10. In shape the jacket is rectangular and therefore has the four sides 17, 19, 20 and 21, as shown in FIG. 4. When the device is installed, the side 19 or side 21 will be adjacent the valve stem lug. The two longitudinal ends of the jacket housing are always open, as shown in FIG. 1. Closely adjacent the outer free edge of the side 17 is a slit opening 22. The numeral 23 designates a tab projection on the outer free edge of the side 21, and which is adapted to detachably extend through the slit opening 22 of the side 17. This tab has a hole 25. In the central area of the side 19 is a cross arranged elongated rectangular opening 26. In the central area of the side 21 is an elongated rectangular 27. When my jacket is embracing a valve, the cross opening 26 will extend transversely of the valve and the opening 27 will extend longitudinally of the valve. Both rectangular openings 26 and 27 have an enlarged open area near their center lengths to accommodate the end 15 of the valve stem.

Figure 5:
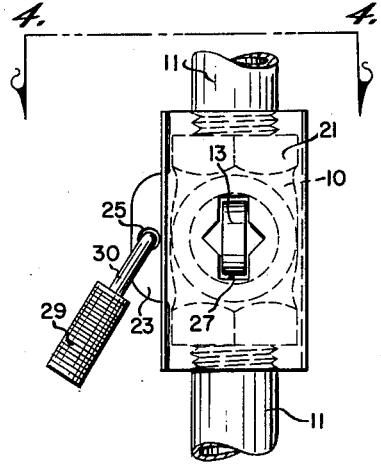
FIG. 5 is a plan view of the installed device holding the valve stem in an open position.

The practical use of my device is as follows: If the valve stem is to be held in an open valve condition, as shown in FIG. 5, the jacket 16 is so folded around the valve housing 10 that the valve stem rectangular lug 13 extends through the opening 27. The jacket forms a rectangular jacket housing around the valve housing and the tab portion 23 is inserted through the slot 22. By placing a nail or like through the hole 25, the jacket will be held in place and by the rectangular hole 27 closely embracing the valve stem rectangular lug 13, the valve cannot be closed as long as the jacket 16 is in place. To prevent the unauthorized removal of the jacket 16, a padlock 29 is used by passing its bar loop 30 through the hole 25 as shown in FIG. 4.

Figure 2:
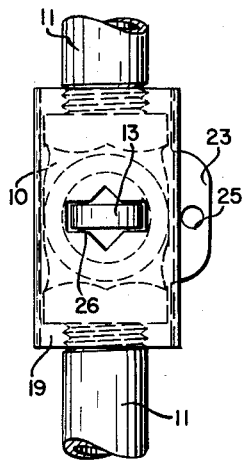
FIG. 2 is a plan view of my device, installed around a valve with the valve stem in a closed position.

On the other hand, if it is desired to maintain the valve stem in a closed position as shown in FIG. 2, the jacket is turned over and the lug 13 (which is now extending transversely of the valve) is threaded through the slot 26. With the slot opening 26 closely embracing the rectangular lug 13 of the valve stem, the valve stem will be held in a closed position. The slot opening 26 will be directly opposite from the slot opening 27. To change a valve stem setting, it is necessary to remove and then properly replace the jacket 16. The position of the slot openings 26 and 27 relative to the lug portion 13 will determine whether the valve will be maintained in open or closed position after the valve has been rotated to such closed or open position. The flexing of the material of the jacket will permit the opening of the jacket 16, as shown in FIG. 1, or permit the closing of the split jacket around the valve as shown in FIG. 4.

Some changes may be made in the construction and arrangement of my valve locking means without departing from the real spirit and purpose of my invention, and it is my intention to cover by my claims, any modified forms of structure or use of mechanical equivalents which may be reasonably included within their scope.

I claim:

1. In a valve locking means, comprising, in combination,
   a valve having a housing and a rotatable valve stem with a portion extending beyond the valve housing elongated and rectangular in cross section,
   a jacket detachably wrapped around said valve housing,
   said jacket having two elongated rectangular slot openings each capable of selectively embracing that portion of the valve stem that is elongated and rectangular in cross section; said slot openings extending transversely to each other,
   a tab on one end of said jacket,
   a slit in the other end area of said jacket for receiving said tab,
   said tab having a hole;
   and a fastening means detachably extending through the hole in said tab;
   said jacket being in rectangular form around said valve housing with said two rectangular slot openings being in opposite sides of said jacket, respectively.

2. In a valve locking means, comprising, in combination,
- a valve having a housing and a rotatable valve stem with one end portion extending beyond the valve housing elongated and rectangular in cross-section and its other end portion extending beyond the valve housing elongated and circular in cross-section,
- a jacket detachably wrapped around said valve housing,
- said jacket comprised of first and second, spaced apart, parallel side wall portions, and first and second spaced apart, parallel end wall portions,
- said first end wall portion extending from one end of said first side wall portions to one end of said second side wall portion at substantially a right angle thereto,
- said second end wall portion extending from the other end of said second side wall portion at substantially a right angle thereto,
- a slit in said first side wall portion adjacent its free end and parallel to the longitudinal axis thereof,
- a tab on the free end of said second end wall portion adapted to be received by said slit,
- said tab having a hole in its outer end for receiving a padlock,
- said first end wall portion having a first elongated slot opening therein extending transverse to the longitudinal axis thereof intermediate its length, and a V-shaped opening extending outwardly from both sides of said first slot opening, said first slot opening adapted to receive either end of said valve stem,
- said second end wall portion having an elongated second slot opening therein extending parallel to the longitudinal axis thereof intermediate its length and a V-shaped opening extending outwardly from both sides of said second slot opening, said second slot opening adapted to receive either end of said valve stem.

References Cited by the Examiner
UNITED STATES PATENTS

| | | | |
|---|---|---|---|
| 1,158,631 | 11/15 | Caldwell | 137—384 XR |
| 1,690,461 | 11/28 | Sieben | 137—383 XR |

ISADOR WEIL, *Primary Examiner.*